Dec. 21, 1926.
H. A. BOWERS
NUT LOCK
Filed August 28, 1926
1,611,408
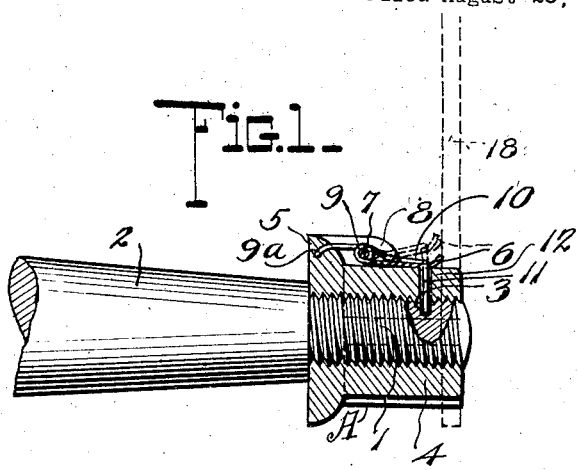
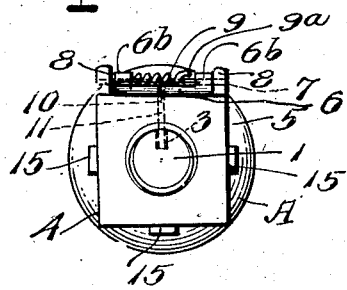
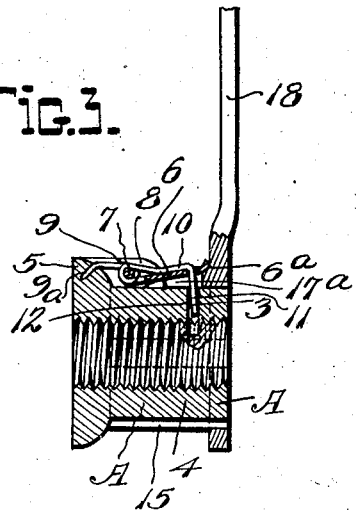
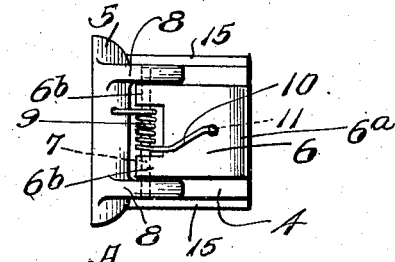
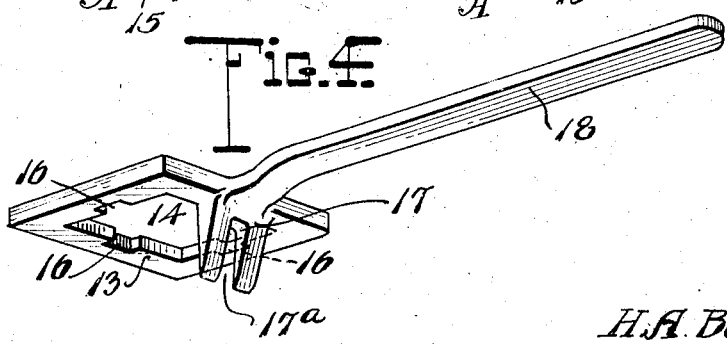
Inventor
H. A. Bowers
By Robt Robt Hill
Attorneys Patented Dec. 21, 1926.

1,611,408

UNITED STATES PATENT OFFICE.

HENRY A. BOWERS, OF CLEVELAND, OHIO.

NUT LOCK.

Application filed August 28, 1926. Serial No. 132,144.

The present invention relates to certain new and useful improvements in nut locks, and has for its object to provide a device of this character which is more especially adapted for use in connection with the nuts which are used upon the axles of wagons, carriages and other vehicles to retain the wheels in place on the axle spindles.

Among the objects of the invention are to provide a nut lock of this character which is comparatively simple and inexpensive in its construction, which will effectively lock the nut against working loose even when the wheels are rotated backwardly, and which embodies novel features of construction whereby the nut is automatically released for rotation when a wrench is applied thereto.

With the foregoing and other objects in view, the invention consists in certain novel combinations and associations of the parts as will more fully appear as the description proceeds.

For a full understanding of the invention reference is to be had to the following description and accompanying drawings in which, Figure 1 is a sectional view through an axle nut which is provided with locking means embodying the invention, the nut being shown as locked in position on the threaded end of an axle spindle.

Figure 2 is an end view of the nut.

Figure 3 is a sectional view through the nut with the latch in position thereon, showing the manner in which the wedge shaped lug on the wrench swings the plate upwardly to release the detent.

Figure 4 is a perspective view of the special wrench which is used for operating the nut, and Figure 5 is a top plan view of the nut and the locking means thereon.

Corresponding and like parts are referred to in the following description and indicated on all of the views of the drawings by like reference characters.

Referring to Figure 1 of the drawings, the numeral 1 designates the reduced and threaded end of an axle spindle 2, both being of the conventional construction, with the exception that the threaded end 1 has a recess 3 therein. The axle nut A is formed with the usual rectangular portion 4 and flange 5.

A plate 6 is arranged on one of the flat sides of the polygonal portion of the nut, said plate being provided at its outer end with an outwardly curved nose 6ᵃ and the inner end of the plate being bifurcated, the arms of the bifurcation being bent to provide pivot eyes 6ᵇ which engage a transverse pin 7. This pin 7 extends transversely across the nut and connects longitudinally extending flanges 8 on opposite sides thereof. A coil spring 9 surrounds the pin 7 between the two pivot eyes 6ᵇ. One end 9ᵃ of the spring is embedded in an opening formed in the flange of the nut, while the other end of the spring terminates in an arm 10 which projects along the outer face of the plate 6, said arm terminating in a detent 11 which extends through an opening in the plate 6 and is received within an opening 12 in the nut. The end of the detent 11 is adapted to project into the interior of the nut and to engage the recess 3 of the threaded portion of the axle to lock the nut in operative position. The tension of the spring 9 normally tends to swing the arm 10 and plate 6 toward the nut and to hold the detent in operative position.

A special wrench such as that shown by Figure 4, is adapted to be used for manipulating the nut to screw it into or out of position. The head 13 of the wrench is formed with an opening 14 which is of a proper size and shape to fit over the polygonal end of the nut. The sides of the nut, with the exception of that one of the sides which is provided with the plate 6, are provided with longitudinally extending ribs 15, and the sides of the opening 14 in the head of the wrench are provided with corresponding notches 16. This construction insures that the wrench will obtain a firm bearing on the nut. A wedge shaped lug 17 projects from the head of the wrench at one side of the opening 14 therein and this lug is forced under the plate 6 when the wrench is applied to the nut thereby automatically forcing the plate outwardly against the action of the spring 9 and moving the detent 11 into inoperative position. The end of the wedge shaped lug 17 is bifurcated at 17ᵃ to straddle the outer end of the detent 11, and a handle 18 which projects from the head of the wrench provides a means for forcibly manipulating the same to rotate the nut. The wrench can be readily applied to the nut and the wedge 17 then operates automatically to lift the plate 6 and move the detent into inoperative position. With the detent in inoperative position the nut can be readily rotated to bring it into operative or inoperative position. When the nut is in operative position it engages the shoulder at the outer end of the axle spindle. If the wrench is then removed the detent 11 will automatically engage the recess 3 to lock the nut against rotation in either direction.

Having thus described my invention what I claim as new and desire to secure by Letters Patent is,

1. In a nut lock, the combination with a threaded stem, of a nut fitted thereon and formed with a lateral opening, a pair of spaced flanges extending longitudinally of the nut on the exterior thereof, a transverse pin connecting the flanges, a plate pivotally mounted on the pin, a spring arranged on the pin and engaging the plate to force it yieldably against the nut, and a detent projecting from the plate through the lateral opening of the nut, said detent being movable into and out of operative engagement with the threaded stem by actuating the plate.

2. In a nut lock, the combination with a threaded stem, a nut threaded thereon, a plate pivotally mounted on the exterior of the nut, a spring engaging the plate to force it yieldably against the nut, said spring being formed with an extension which projects laterally from the plate and is movable into and out of engagement with the threaded stem by actuation of the plate.

3. In a nut lock, the combination with a threaded stem, a nut threaded thereon, a swinging plate mounted on the exterior of the nut and having an opening therein, and a wire spring engaging the plate to force it yieldably against the nut, one end of the wire spring being formed with an extension which projects through the opening of the plate and is movable into and out of operative engagement with the threaded stem by actuating the plate.

4. In a nut lock, the combination with a threaded stem, of a nut threaded thereon, a transverse pin on the nut, a plate pivotally mounted on the pin and a coil spring surrounding the pin, one end of the spring extending along the plate to hold the plate against the nut and terminating in a detent which projects laterally from the plate and is movable into and out of operative engagement with the threaded stem by actuating the plate.

5. In a nut lock, the combination with a threaded stem, of a nut threaded thereon, a transverse pin on the nut, a plate pivotally mounted on the pin and having an opening therein, and a coil spring surrounding the pin, one end of the spring extending along the plate to hold the plate against the nut and terminating in a laterally projecting detent which extends through the opening of the plate and is movable into and out of operative engagement with the threaded stem by actuating the plate.

In testimony whereof I affix my signature.

HENRY A. BOWERS.